United States Patent [19]
Brown

[11] 3,885,624
[45] May 27, 1975

[54] PROCESS FOR CARBON DIOXIDE MANUFACTURE
[75] Inventor: Larry P. Brown, Tulsa, Okla.
[73] Assignee: Cities Service Oil Company, Tulsa, Okla.
[22] Filed: Jan. 21, 1974
[21] Appl. No.: 435,147

Related U.S. Application Data
[62] Division of Ser. No. 116,356, Feb. 18, 1971, abandoned.

[52] U.S. Cl. .................. 166/57; 55/48; 166/267; 166/313
[51] Int. Cl. ............................................. E21b 43/00
[58] Field of Search ............ 55/48, 68, 57; 166/266, 166/267, 310, 313; 423/228, 229, 232, 220

[56] References Cited
UNITED STATES PATENTS

| | | | |
|---|---|---|---|
| 1,852,763 | 4/1932 | Trotter | 55/68 |
| 2,688,368 | 9/1954 | Rodgers et al. | 166/267 |
| 2,723,001 | 11/1955 | Hoff | 55/68 |
| 2,792,903 | 5/1957 | Hoff | 55/68 |
| 3,097,917 | 7/1963 | Dotts, Jr. et al. | 55/68 |
| 3,442,332 | 5/1969 | Keith | 166/266 |
| 3,739,850 | 6/1973 | Sizen | 166/313 |

Primary Examiner—James A. Leppink
Attorney, Agent, or Firm—Elton F. Gunn

[57] ABSTRACT

Carbon containing materials, for example hydrocarbons, are burned for the production of flue gas consisting primarily of carbon dioxide and nitrogen. The carbon dioxide is separated from the nitrogen by injecting the flue gas mixture into a well with an absorbent to a depth in excess of that required to develop the necessary pressure head at which the carbon dioxide is dissolved in the absorbent. The absorbent ladened with carbon dioxide is then brought to the surface and flashed in a separator for recovery of the absorbent therefrom and production of high quality carbon dioxide.

2 Claims, 1 Drawing Figure

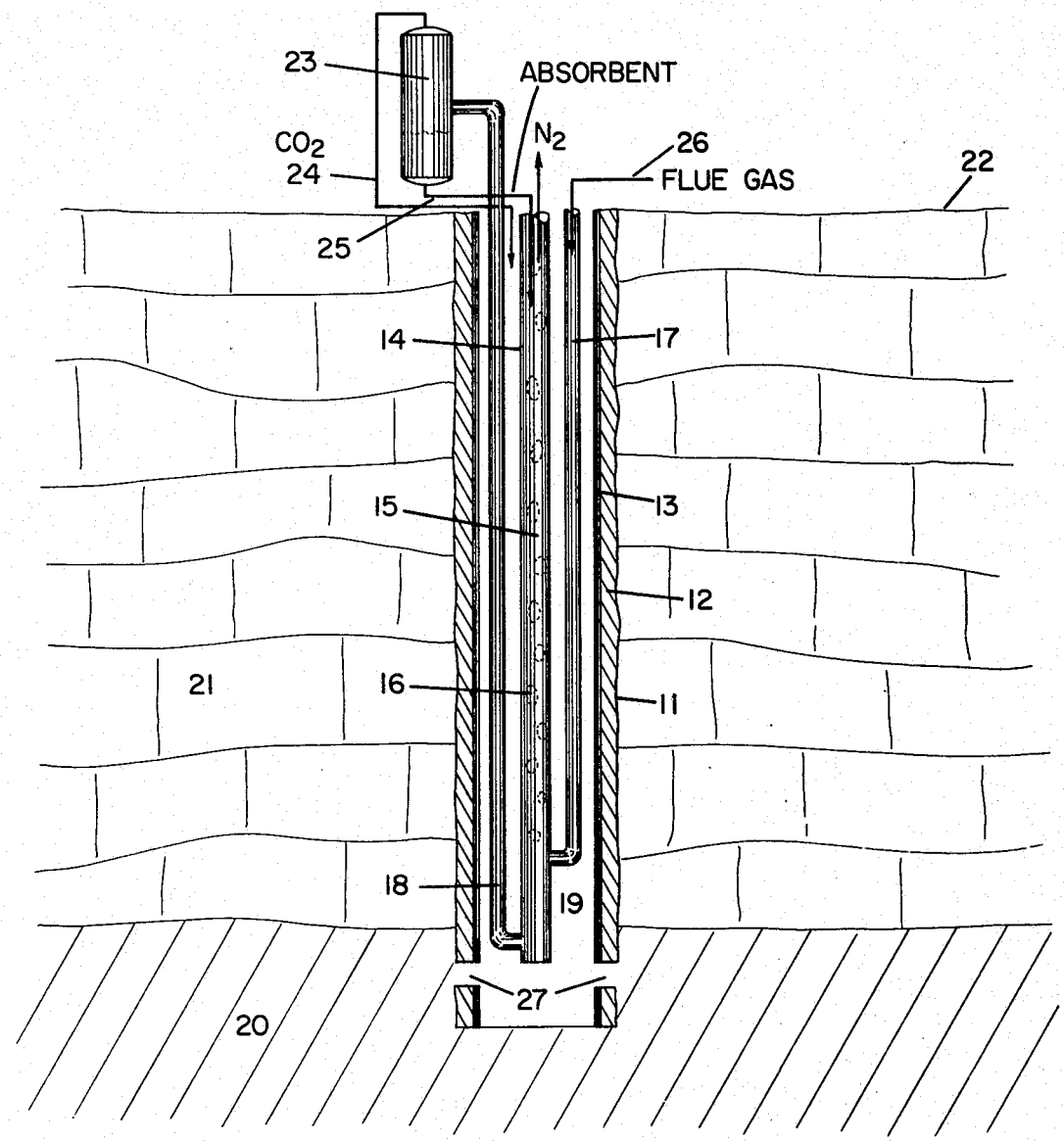

PROCESS FOR CARBON DIOXIDE MANUFACTURE

This is a division of application Ser. No. 116,356, filed Feb. 18, 1971 now abandoned.

BACKGROUND OF THE INVENTION

The present invention relates to a process for the manufacture of carbon dioxide. More particularly, the process of the present invention utilizes the natural gravitational characteristics of fluids injected in wells for the solution of carbon dioxide in an absorbent.

Recent activity in the utilization of carbon dioxide in secondary and tertiary oil recovery techniques by miscible gas drive has brought to a paramount the requirement for the production, separation and subsequent injection of carbon dioxide into oil wells. A proposed method of carbon dioxide manufacture is taught by Keith, U.S. Pat. No. 3,442,332, in which Keith utilizes substantially pure gaseous carbon dioxide produced from a hydrocarbon feed for injection into underground formations containing crude oil. In the method taught by Keith, carbon dioxide is produced simultaneously with ammonia production. The inherent difficulty in the teachings of Keith is the requirement of large plants to be utilized for economic production of ammonia, which often is not readily disposable in the area in which carbon dioxide injection is required. Alternatively, hydrocarbons such as natural gas streams may be burned with air to form a carbon dioxide ladened fuel gas mixture from which the nitrogen must be separated by cryogenic distillation procedures followed by subsequent purification of the carbon dioxide produced. These processes both exhibit exorbitant economics and require large facilities for the production of carbon dioxide and therefore are generally inhibitive for use in the oil field in the production of carbon dioxide for miscible gas drives. What is required is a method for the production and purification of carbon dioxide in desirable quantities at remote installations.

It is an object of the present invention to provide a process for the manufacture of carbon dioxide.

It is a further object of the present invention to utilize the combustion products of carbonaceous materials and the natural gravitational effects of injecting the same in a wellbore for the production of carbon dioxide.

It is still a further object of the present invention to provide a process with minimal energy requirements in which flue gas may be subjected to an absorbent for the separation and purification of carbon dioxide therefrom.

With these and other objects in mind, the present invention may be more fully understood through the following drawing and description.

SUMMARY OF THE INVENTION

The objects of the present invention are accomplished through use of a process for the manufacture of carbon dioxide. The process comprises the burning of a carbonaceous material to form a flue gas consisting essentially of carbon dioxide and nitrogen. A carbon dioxide absorbent is injected into a tubing string hung in a completed well with the flue gas introduced into the tubing string, containing the absorbent. The flue gas is introduced at a depth at which the carbon dioxide will normally be absorbed due to the pressure head developed by the absorbent contained within the tubing string. The carbon dioxide ladened absorbent is then produced from the well, with the carbon dioxide separated therefrom the absorbent, for example by flashing, although this separation may be accomplished downhole. The process may comprise the maintaining of sufficient pressure at the wellhead on the absorbent to insure the total absorption of carbon dioxide at the depth of the injection of flue gas. Unabsorbed nitrogen may be allowed to return to the surface through the tubing string by bubbling through the injected absorbent countercurrently so as to completely wash all carbon dioxide therefrom. The process of the present invention may further comprise the reinjection of the carbon dioxide separated from the flue gas into the annulus formed between the tubing string and completed casing so as to cause it to be injected into a hydrocarbon bearing formation as utilized in the miscible displacement process.

The objects of the present invention may be also accomplished through the use of apparatus in the manufacture of carbon dioxide. The apparatus comprises a well drilled within the earth with the first tubing string hung therein. The second tubing string extending from the surface is connected to the lower portion of the first tubing string. Means are provided for separating the carbon dioxide from the absorbent, for example by returning fluid to the surface and passing it through a vaporizer connected so as to receive the fluid returned to the surface. The apparatus may further comprise a carbonaceous material burner supplied by air as an oxident connected to the second tubing string at the earth's surface.

BRIEF DESCRIPTION OF THE DRAWING

The present invention may be more fully understood through the accompanying Figure in which is depicted a preferred embodiment of the present invention representing one embodiment of the apparatus which may be used for the manufacture of carbon dioxide from carbonaceous materials.

DETAILED DESCRIPTION OF THE INVENTION

The present invention utilizes conventional methods of burning carbonaceous materials, for example hydrocarbons as in the burning of wellhead natural gas with air, for the formation of flue gas consisting primarily of carbon dioxide and nitrogen. The inherent problems of separation of carbon dioxide from the nitrogen is solved in a particularly novel fashion by injecting the flue gas mixture into a well so as to be comingled with an absorbent at a depth at which the presure is developed within the wellbore such that carbon dioxide is absorbed within the absorbent. By adjusting the pressure of the wellhead for the carbon dioxide injection or absorbent injection, the carbon dioxide can be made to become absorbed in the absorbent and separated by vaporization from the absorbent for manufacture of purified carbon dioxide. The absorbent may then be recycled or returned to the desired depth of injection within the well for continued flue gas processing.

Therefore, through the process of the present invention, a carbonaceous material is burned and thereby separated in a wellbore by simultaneous injection of an absorbent. A gas-liquid separator may be provided at the surface or downhole for carbon dioxide separation so the carbon dioxide is separated therefrom the absorbent with the desired purified product, carbon dioxide, being obtained. The absorbent may comprise any carbon dioxide absorbing material, although absorbents selected from the group consisting of normally gaseous hydrocarbons having three or more carbon atoms are preferred. In particular, it is preferred that propane be used as it is readily accessible at most locations, is easily separated from the carbon dioxide at moderate pressures, and carbon dioxide has a high absorbtivity therein. A further embodiment of the present invention may involve the reinjection of the carbon dioxide within the formation for use as a miscible displacement material with the further provision of the same wellbore used for separation also being used for the carbon dioxide miscible gas injection.

The nitrogen gas passes through the well still in gaseous form due to high pressure required to absorb it. The nitrogen may be allowed to pass up the tubing string through which the absorbent is injected, within the well, and either vented to the atmosphere or utilized for other commercial purposes.

The particular advantages of the present invention may be more fully understood by referral to the accompanying FIGURE in which is depicted one embodiment of the present invention typifying apparatus which may be utilized for the manufacture of carbon dioxide from burned carbonaceous materials. Referring to the FIGURE, a well 11 is drilled from the earth's surface through overburdened rock 21 into a hydrocarbon-bearing formation 20. The well 21 may be cased and completed through casing 13 completed by cement 12 with the casing 13 being completed in the formation 20 of interest by perforations 27. A first tubing string 14 is hung within the well with a second tubing string 17 connected thereto at its lower portion, the lower portion generally being thought of as a point from 50 to 200 feet above the bottomhole of the well or the bottom of the first tubing string 14 hung therein. A third tubing string 18 is connected to the bottom of the first tubing string 14 so as to form a continuous tubing length from the earth's surface to the bottomhole and back to the earth's surface. A vaporization unit or flash distillation arrangement 23 may be connected thereto the third tubing string 18 at the earth's surface. A carbonaceous material burner, not depicted herein the FIGURE, may also be connected to the second tubing string 17 such that flue gas produced therein may be injected within the second tubing string 17.

In the normal operation of the process of the present invention, flue gas, represented by numeral 26, is introduced into the second tubing string 17 simultaneously with the introduction of absorbent 15 into the first tubing string 14. The flue gas 26 and absorbent 15 are comingled at the intersection of the second tubing string 17 with a first tubing string 14 at the lower portion of the first tubing string 14, so as to allow the absorption of the carbon dioxide contained within the flue gas 26 within the absorbent 15. Unabsorbed inert gases 16, for example nitrogen, are allowed to proceed by their own buoyant effect within the absorbent 15 to the earth's surface 22 where they may be separated from the injected absorbent 15 for discarding into the atmosphere or uses in other manufacturing processes, for example the manufacture of ammonia. Simultaneously, with the introduction of flue gas 26 and absorbent 15, the carbon dioxide ladened absorbent is allowed to flow to the earth's surface by decreasing the pressure head upon the third tubing string 18. The carbon dioxide ladened absorbent is then flashed to a lower pressure within a vaporization unit 23. The carbon dioxide 24 produced therefrom may be utilized in commercial processes requiring purified carbon dioxide or as depicted in the FIGURE, may be reinjected into the annulus 14 formed between the first tubing string 14, second tubing string 17 and third tubing string 18; and the casing 13 so as to be caused to enter the formation 20 through perforations 27 contained therein the casing 13.

Therefore, the process of the present invention provides a significant advantage over the prior art in the fact that no separational process is required other than utilizing the natural gravitational forces of the earth to absorb the carbon dioxide. Although it may be a necessary requirement of the present invention to maintain pressure upon the absorbent at the wellhead to develop a sufficient pressure bottomhole for the comingling and dissolving therein of the carbon dioxide from the flue gas mixture, normally, exceptionally high wellhead pressures or especially deep wells are not required as wells in the vicinity of 4,000 to 8,000 feet in depth will adequately provide the head required. For example, the mere injection of propane at the surface with several hundred pounds of pressure thereon will provide several thousand pounds head pressure at a depth of 5,000 feet. Similarly, the vaporization unit may be maintained under pressures from 50 to 100 pounds less than the wellhead pressure maintained on the absorbent such that the carbon dioxide may be flashed therefrom the absorbent with little makeup pressure maintenance being required for reinjecting the absorbent therein the first tubing string. Also, by utilizing a lower pressure on the vaporization unit than that of the wellhead causes a natural production of the carbon dioxide ladened absorbent from the bottomhole to the vaporization unit. Therefore, no external energy is required for the production therefrom of the carbon dioxide ladened absorbent or the flashing and separation of the carbon dioxide. In similar fashion, the unabsorbed nitrogen will naturally meander through the first tubing string to the surface and may be separated therefrom the injected propane by a simple gas-liquid separator maintained at the wellhead. Relatively pure nitrogen is then produced from the wellhead without external pressure being required.

It is conceivable that a small compressor may be required for the injection of flue gas into the system since the head on the flue gas will normally not be as high as that of the absorbent utilized within the system. To maintain a stable system, without pressure unbalance, and inhibit the absorbent from being produced through the gas injection inlet, a head in excess of the wellhead pressure on the absorbent is required. Therefore, it is normally conceivable that a pressure from 50 to 100 pounds above that of the wellhead pressure on the absorbent be maintained on the flue gas at the surface so as to provide a safety check and stable system at the bottomhole. Generally, the high pressures provided by the gas expansion of the carbonaceous materials as the carbon containing materials, for example wellhead natural gas, are burned and expand provides a pressure which may be required for injection of the flue gas into the system.

To further understand the apparatus and process of the present invention, the following example is depicted for the utilization of the apparatus and process for the manufacture of carbon dioxide.

EXAMPLE

Using the embodiment of the apparatus disclosed in the accompanying FIGURE, one mole of methane is introduced into a carbonaceous burner and reacted with 10 moles of air. From this reaction, 1 mole of carbon dioxide is produced, with 8 moles of nitrogen and 2 moles of water. The water is scrubbed from the system by interjection into a water absorbent, for example a monoethanol amine solution, with the production therefrom of 8 moles of nitrogen and 1 mole of carbon dioxide in a dehydrated form. This material is then injected into the second tubing string 17 depicted in the FIGURE and comingled with 0.681 moles of propane at an appropriate depth in the well and with an appropriate wellhead pressure upon the absorbent to yield 2,000 pounds pressure at 180°F. at the bottomhole. The flue gas and absorbent are comingled in the first tubing string 14. Eight moles of nitrogen are allowed to be released from the wellhead through the first tubing string 14. The 0.681 moles of propane and 1 mole of carbon dioxide are produced from the third tubing string 18, allowed to enter the vaporization unit 23. The vaporization unit is maintained at 300 pounds and 80°F. This vaporization releases 0.932 moles of carbon dioxide in a gaseous form with 0.749 moles of liquid, representing 0.681 moles of propane and 0.068 moles of carbon dioxide being produced. Normally, this material would be reflashed for the total recovery of carbon dioxide. The propane may be reinjected into the first tubing string 14 for further comingling and absorption of carbon dioxide. A portion of the absorbent may be purged from the system with makeup propane being added such that stable conditions at the bottomhole are maintained for the solution of carbon dioxide.

Therefore, it can be seen that through exact engineering applications, the process and apparatus of the present invention may be utilized for the separation of carbon dioxide from flue gas mixtures such that exact amount of absorbent, pressures, temperatures, equipment size and other criteria may be maintained for the separation of carbon dioxide therefrom, thereby requiring minimal amounts of energy to be expanded for the economic recovery and carbon dioxide. Generally, by the gas is meant any carbon dioxide containing gas having impurities therein, although the gaseous product resulting from the burning of carbonaceous materials is most often the source. Carbon dioxide produced may be utilized for processing with other chemicals for chemical manufacture or as disclosed, may be reinjected within the same wellbore utilized for the separation process as a miscible gas for the miscible displacement of oil within hydrocarbon containing reservoirs.

While the present invention is described with reference to particular embodiments thereof, it will be appreciated by those familiar with the art that various changes and modifications can be made without departing from the scope of the invention as set forth.

Therefore, I claim:

1. Apparatus for the manufacture of carbon dioxide comprising:
   a. a well drilled into the earth,
   b. a first tubing string hung within the well,
   c. a flue gas generating means located at the surface for producing carbon dioxide by burning a carbonaceous material,
   d. a second tubing string leading from said generating means into the lower portion of said first string,
   e. vaporizer means for separating carbon dioxide from an absorbent therefor, said vaporizer having a carbon dioxide removal line leading therefrom and an absorbent removal line leading therefrom into said first string, and
   f. a third tubing string which leads from the lower portion of said first tubing string into said vaporizer.

2. Apparatus as in claim 1 wherein said well is cased and completed, thereby providing an annulus between said tubing strings and said casing, and wherein said carbon dioxide removal line from the vaporizer leads into said annulus.

* * * * *